Patented Nov. 29, 1949

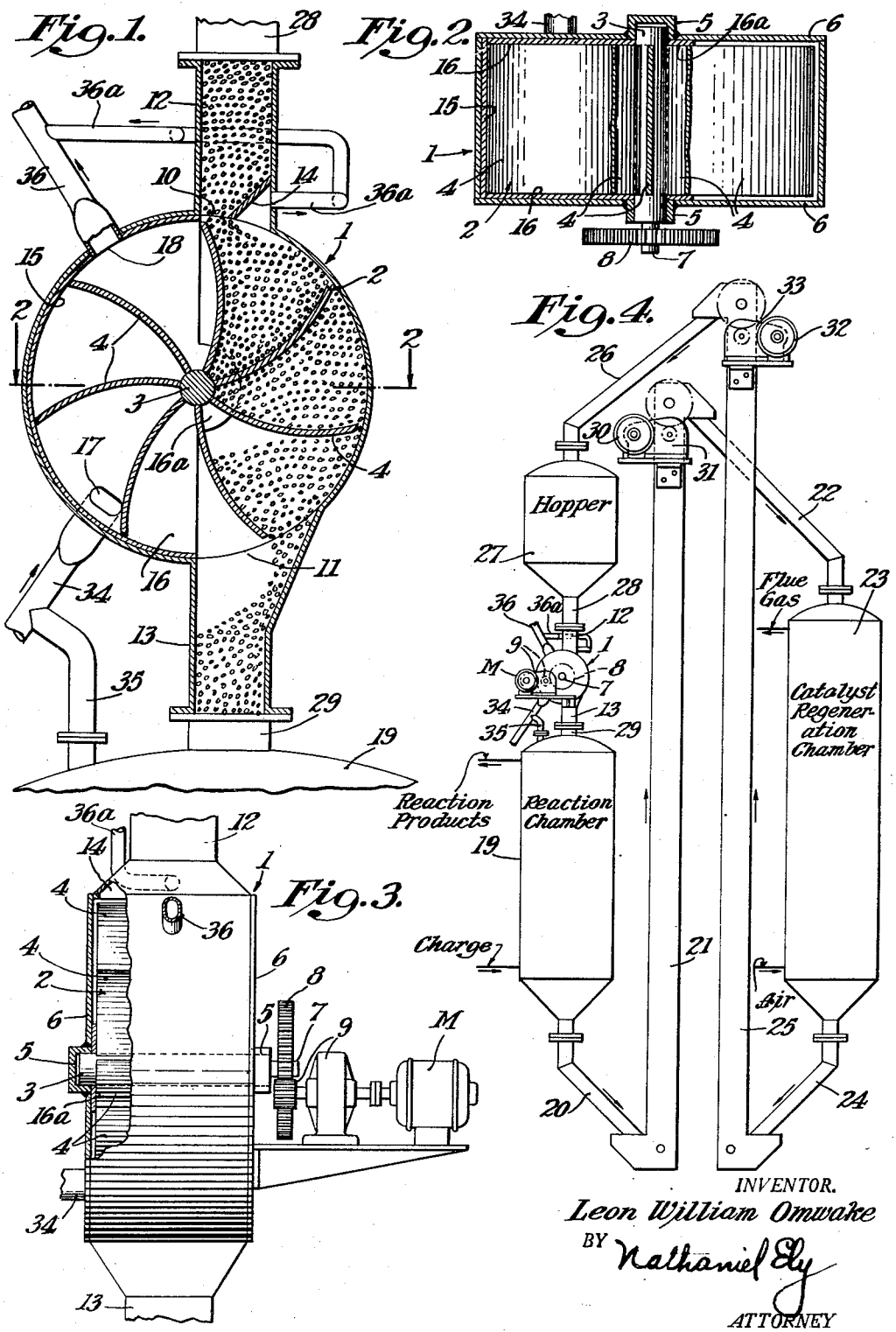

2,489,925

UNITED STATES PATENT OFFICE 2,489,925

CATALYST FEEDER

Leon W. Omwake, Mamaroneck, N. Y., assignor to The Lummus Company, New York, N. Y., a corporation of Delaware Application May 1, 1946, Serial No. 666,434

5 Claims. (Cl. 23—288)

This invention relates to the handling of granular material and is concerned with prevention of crushing or abrasion of such material in a transfer operation required in certain processes. More particularly the invention is concerned with the protection of granular material employed in a contact process in which the material is continuously transferred between zones which must be maintained at different pressures. For example, in a certain type of catalytic reaction system a granular catalyst is continuously passed through a reaction zone and a catalyst regeneration zone in succession and thence back to the reaction zone. In some cases in order to preserve a required pressure differential between the zones the catalyst in passing from zone to zone is constrained to form a long sealing leg which necessitates an objectionably tall apparatus. In other cases the catalyst is passed from zone to zone through a mechanical sealing and feeding device. Such devices, however, often cause crushing or abrasion of the catalyst grains so that the size of the grains is reduced below that required for optimum performance. Fines are also produced and these are carried off with the reaction products or with the gases discharged from the regeneration zone. Much of the catalyst is thereby wasted.

An important object of the present invention is to provide, for the transfer or feeding of a granular material, an improved mechanism devised to protect the grains of the material from crushing or abrasion.

Another object of the invention is to provide an improved transfer mechanism of the "star feeder" type devised to protect the granular material and also form a gas seal.

These and other objects and advantages of the invention will appear from the following description taken in connection with the accompanying drawing.

In the drawing:

Fig. 1 is a vertical sectional view of the improved feeder device;

Fig. 2 is a horizontal section approximately on the line 2—2 of Fig. 1;

Fig. 3 is a side view of the device, partly in section; and

Fig. 4 is an elevation of a catalytic reaction system embodying the feeder device.

The structure of the feeder device includes a substantially cylindrical drum-like casing 1 disposed with its axis horizontal, or substantially so. Within the casing there is a rotor 2 of the star-wheel type comprising a hub 3 and blades 4 extending radially from the hub and equally spaced therearound. In the present instance there are seven blades and they are preferably curved, as shown. However, their number and their shape may be varied. The opposite ends of the hub are journalled in bearings 5 on the opposite end walls 6 of the casing. One end of the hub bears a stub shaft 7 to which a gear 8 is affixed. A motor M drives said gear, through reduction gearing 9, and rotates the rotor clockwise, with reference to Fig. 1. At the upper side of the casing the circumferential wall thereof has an inlet port 10 and, at the underside of the casing said wall has an outlet port 11. In the present instance the port 10 is offset from the vertical center line of the rotor, in the direction of rotation of the rotor, and the discharge port is in vertical alignment with port 10. The arrangement of the ports may be varied, however. A charging nozzle 12 on the casing extends vertically upward from the inlet port, and a discharge nozzle 13 borne by the casing extends vertically downward from the discharge port. The nozzle 12 has therein a baffle 14 extending from the right-hand wall thereof, with reference to Fig. 1, and inclined downwardly toward the left-hand wall. The discharge nozzle 13 has the upper portion 13a of its right-hand wall inclined upwardly and outwardly to its juncture with the circumferential wall of the casing. Both nozzles are flanged at their outer ends.

From the right-hand side of the inlet port 10 to the right-hand side of the outlet port 11 the circumferential wall of the casing forms an arc concentric with the axis of the casing and having a radius exceeding that of the path of the outer edges of the rotor blades. The end walls 6 also have the portions thereof which are disposed at the right of a vertical line through the rotor axis spaced from the paths of the side edges of the rotor, as shown in Fig. 2. This spacing of the circumferential wall and the end walls from the rotor affords a clearance for prevention of pinching or crushing of grains of the material, as will be explained hereinafter. At the opposite side of said vertical line through the axis the circumferential wall of the casing lies within an arc also concentric with the axis and having a radius only slightly greater than that of the path of the outer edges of the blades. The portions of the end walls 6 at this side of the axis are also quite close to the paths of the side edges of the blades. The close relation of the circumferential wall and the end walls to the rotor may be obtained by forming the body of the casing for that purpose or by providing the circumferential wall with an arcuate liner 14 and providing the end walls with flat liners 16. The latter have central portions 16a extending around the hub of the rotor. The closeness of the casing to the rotor, at the left of the axis, provides a desired sealing effect.

In the present instance the close fitting portion of the casing, at the left of the axis, is of sufficient circumferential extent to include three blades of the rotor, and the portion of the circumferential wall at the right of the axis is of sufficient extent to include at least two of the blades. The casings so formed with relation to the number and spacing of the blades as to ensure that three of the blades will have their outer edges in direct opposition to the close-fitting portion of the circumferential wall, at the left of the axis, at all times, and that two of the blades will have their outer edges in direct opposition to the portion of said wall of greater radius, at the right of the axis, at all times. The blades are also arranged with their convex sides facing in the direction of movement of the blades.

One of the end walls of the casing has an inlet port 17, for sealing gas and the circumferential wall has an outlet port 18 for said gas. These ports are within the sealing portion of the casing at the left of the axis, with reference to Fig. 1. They are so spaced around the axis with reference to the number and spacing of the blades as to ensure the presence of two of the blades between the ports at all times.

In Fig. 4 the feeder just described is shown embodied in a continuous catalytic reaction system of the type disclosed in a U. S. patent to Simpson et al. No. 2,320,318. In such a system a granular catalyst whose grains are preferably of bead form or pellet form are continuously passed downwardly through a reaction chamber 19. From the lower end of said chamber the catalyst is passed through a tubular chute 20 in sealed connection with the chamber to the lower end of an enclosed endless conveyor 21, vertically arranged. Said chute is kept charged with the catalyst to form a sealing leg. Conveyor 21 elevates the catalyst and discharges it through an inclined tubular chute 22 into a catalyst regeneration chamber 23. The regenerated catalyst is continuously discharged through an inclined chute 24, in sealed connection with the lower end of chamber 23, to the lower end of an enclosed endless conveyor 25, vertically arranged. Conveyor 25 elevates the catalyst and discharges it through an inclined tubular chute 26 into a closed hopper 27. Said hopper has a vertical tubular discharge chute 28 flanged at its lower end. The feeder device is interposed between the chute 28 and the reaction chamber 19, the flanged upper end of the inlet nozzle 12 of said device being detachably secured in sealed connection to said flanged end of the chute, and the flanged lower end of the discharge nozzle 13 of the device being detachably secured in sealed connection to a flanged inlet nozzle 29 projecting from the upper end of the reaction chamber.

The conveyor or elevator 21 is driven by a motor 30, through a reduction gearing 31, and the elevator 25 is driven by a motor 32, through a reduction gearing 33. The drives of said elevators are correlated to the capacity and the drive of the feeder rotor to ensure maintenance of the catalyst in the hopper 27 at a predetermined level.

A pipe 34 is connected to the gas inlet port 17 of the feeder casing to conduct to the casing a suitable inert sealing gas such as flue gas, for example, under pressure to retain the pressure in the reaction chamber 19. A branch pipe 35 leads from pipe 34 to the reaction chamber to equalize the gas pressures in the feeder casing and said chamber. A pipe 36 connected to the gas outlet port 18 conducts gas from the feeder casing. This pipe has a branch 36a leading from the nozzle 12, at a point beneath the baffle 14.

In the operation of the feeder the granular material is continuously delivered through the nozzle 12 by gravity and flows in a stream past the baffle 14 and into the casing of the feeder. By rotation of the rotor clockwise, with reference to Fig. 1, the inter-blade compartments of the rotor are brought in succession into position to be charged by said stream of material. The width of this stream along the path of the blades is limited by the baffle 14 in order to avoid cutting of a wide stream by the blades as they pass the inlet port 10. After the blades have passed said port, with the compartments fully charged, crushing of grains of the material between the edges of the blades and the casing is prevented by the provision for adequate clearance, previously described herein. Preferably the clearance between the outer edges of the blades and the circumferential wall and between the side edges of the blades and the end walls of the casing slightly exceeds the major dimension of the grains. The downwardly moving blades can then pass a single layer of the grains which may lag upon the inner surfaces of the casing and avoid pinching, crushing or abrasion of the grains. As each descending blade passes the outlet port the contents of the compartment between that blade and the following blade is discharged through said port.

A substantial seal is also obtained by the close relation of the casing to the upwardly moving blades and by the admission of sealing gas to the portion of the casing at the left of the rotor axis. The sealing effect thus obtained adapts the feeder for satisfactory employment in the system shown in Fig. 4. Usually in the operation of such a system a higher pressure must be maintained within the reaction chamber 19 than in other parts of the system. The sealing effect provided for prevents leakage of gas from the reaction chamber past the rotor despite the fact that the rotor compartments at only one side of the axis are charged with the catalyst. At the left of the axis, with reference to Fig. 1, three of the blades are always in close relation to the casing and two blades are always disposed between the sealing gas ports 17 and 18. Therefore, only a relatively small input of sealing gas is required. At the right of the axis, at least two of the blades, with a fully charged compartment therebetween, will always be between the ports 10 and 11 to prevent escape of gas at this side of the axis.

It will be obvious that my invention provides a very simple and satisfactory feeder device designed throughout to protect fully the granular material handled from pinching, crushing or abrasion and designed also to provide an adequate seal.

While the invention is disclosed in connection with a catalytic reaction system its utility is by no means limited to employment in such a system. It may be employed advantageously in many other services where granular material is handled and preservation of the grains intact is required.

It is to be understood that the present disclosure of my invention is merely illustrative and in nowise limiting and that the invention comprehends such modifications as will come within the scope of the following claims.

I claim:

1. A feeder device for granular material, including a rotor mounted for rotation on a substantially horizontal axis and having blades extending radially outward and equally spaced around the rotor axis, and a casing enclosing said rotor and having opposite end walls and a circumferential wall, the latter being opposed to the outer edges of the rotor blades and provided with an inlet port at the upper side of the casing and an outlet port at the lower side of the casing, for passage of granular material through the casing under control of the rotor, a circumferential portion of said wall between said ports and located at one side of said axis being radially spaced outwardly materially from the path of the outer edges of the blades to prevent crushing of grains of the material between the walls and the blades moving downwardly, the said inlet and outlet ports being both located at the same side of the rotor axis as said outwardly spaced wall portion, and a circumferential portion of said wall between said ports and located at the opposite side of the axis lying close to said blade path, the circumferential length of each of said wall portions being sufficient to include at least two adjacent ones of the blades, and said wall portions each extending the full axial width of said blade edges.

2. A feeder device as claimed in claim 1, wherein the portions of said end walls of the casing adjacent the first-named portion of said circumferential wall are materially spaced from the side edges of the rotor blades to prevent crushing of grains of the material between said walls and the blade edges, and the portions of said end walls adjacent the other of said circumferential wall portions are close to the side edges of the blades.

3. A feeder device as claimed in claim 1, wherein the portions of said end walls of the casing adjacent the first-named portion of said circumferential wall are materially spaced from the side edges of the rotor blades to prevent crushing of grains of the material between said walls and the blade edges, the portions of said end walls, adjacent the other of said circumferential wall portions are close to the side edges of the blades, and the casing has an inlet for sealing gas located for admission of the gas at said opposite side of the axis.

4. A feeder device as claimed in claim 1, wherein the said outwardly spaced portion of the circumferential wall of the casing forms part of a circle having its center falling on the rotor axis, and said portion of the circumferential wall at the opposite side of the axis forms a part of another circle with its center falling on said axis and of shorter radius than the first-mentioned circle.

5. A feeder device as claimed in claim 1, wherein the said outwardly spaced portion of the circumferential wall of the casing forms part of a circle with its center falling on the rotor axis, said portion of the circumferential wall at the opposite side of the axis forms part of another circle with its axis falling on said axis and of shorter radius than the first-mentioned circle, and the casing having at said opposite side of the axis an inlet and an outlet for sealing gas spaced around the axis to include therebetween at least two of the blades.

LEON W. OMWAKE.

REFERENCES CITED

The following references are of record in the file of this patent:

UNITED STATES PATENTS

| Number | Name | Date |
|---|---|---|
| 357,435 | Waring | Feb. 8, 1887 |
| 1,369,968 | Drawer | Mar. 1, 1921 |
| 2,440,482 | Martin | Apr. 27, 1948 |